United States Patent [19]
Lee

[11] 3,876,999

[45] Apr. 8, 1975

[54] UNITARY COMBUSTION DETECTOR AND FIRE ALARM

[76] Inventor: Joo C. Lee, 303 Hackberry Dr., Arlington Heights, Ill. 60004

[22] Filed: Apr. 18, 1973

[21] Appl. No.: 352,470

[52] U.S. Cl.............................. 340/237.5; 250/385
[51] Int. Cl. .......................................... G08b 17/12
[58] Field of Search ........ 340/237.5, 420, 401, 402; 356/207; 250/573–577, 381–385

[56] References Cited
UNITED STATES PATENTS

| | | | |
|---|---|---|---|
| 3,255,441 | 6/1966 | Goodwin et al. ................ | 340/237.5 |
| 3,548,205 | 12/1970 | Ogden ......................... | 340/237 UX |
| 3,550,118 | 12/1970 | Jenkins .............................. | 340/396 |

FOREIGN PATENTS OR APPLICATIONS 1,088,976   10/1967   United Kingdom ................ 250/384

Primary Examiner—Donald J. Yusko
Assistant Examiner—Daniel Myer

[57] ABSTRACT

A combustion detector is combined with a turbulence detector and an audible alarm in a unitary system package. The combustion detector comprises a parallel-connected chamber arrangement, with the detection chamber in one leg of a bridge circuit and the reference chamber in another leg. The turbulence detector overrides the combustion detector arrangement and prevents issuance of a combustion indicating signal which might otherwise be caused by air movement without any combustion. The turbulence detector also provides a separate output signal to indicate excessive air movement. The combustion detector and turbulence detector circuits are provided in a small package, so that the total detector-and-alarm volume required does not exceed the dimensions of previous fire alarms without any detector. A visible indicator is incorporated in the system for positive identification of the alarm-sounding location.

12 Claims, 6 Drawing Figures

3,876,999

UNITARY COMBUSTION DETECTOR AND FIRE ALARM

BACKGROUND OF THE INVENTION

Various types of combustion detector circuits are now known. One typical circuit includes a field effect transistor (FET) connected in series with a single detection chamber to enhance circuit operation. Even with such arrangements there have still been problems, such as long term drift, and erroneous actuation in the presence of air turbulence or even atmospheric pressure changes.

Another problem is that with known alarm systems, in which the alarm is actually located some distance from the combustion detector, there are high installation costs for the wiring between alarm and detector. Not only must the wiring be provided between alarm and detector, but in addition such an arrangement requires supervision (or monitoring) of the wiring between alarm and detector. This supervisory installation further adds to the total cost of installing the system.

Some attempts have been made to add a sounding device to a smoke detector unit. The resultant device has not achieved a sufficiently high sounding level to meet present NFPA (National Fire Protection Association) and/or UL (Underwriters Laboratory) standards. To meet these standards it is conventional practice to provide separate alarm and detector units.

Another shortcoming of known systems is that a large number of alarms are frequently installed in a large building or structure. Many systems activate all the alarms when only a single detector senses the presence of combustion particles. Within a building, there may be 20 or more detectors and/or alarms in a single duct; if one detector sets off all the alarms, the specific location of the trouble in the duct will not be manifested.

It is therefore a principal consideration of this invention to provide a unitary arrangement in which an ionization type detector for particles of combustion is combined with an alarm in a compact, efficient package.

Another important consideration of this invention is the provision of a detector circuit configuration which overcomes the problems of previous series-connected detectors.

Yet another important consideration of this invention is the prevention of erroneous alarm signals which would otherwise be caused by air turbulence.

Still another significant consideration of this invention is the provision of an alarm-plus-detector system which substantially reduces installation costs as contrasted to known systems in which the detector is located at a distance from the alarm.

Another salient consideration of this invention is to provide an alarm-detector combination for use in a multiple alarm system which positively identifies the location of the detector initiating an audible alarm transmission.

SUMMARY OF THE INVENTION

The present invention comprises a unitary alarm-detector assembly which comprises a housing, including a side wall portion which defines an aperture. An electrical motor unit, which includes a winding and an armature, is affixed within the housing so that the armature extends through the housing aperture. A gong is disposed adjacent the side wall portion of the housing. A detector sensitive to products of combustion is also supported within the same housing. This combustion detector is operable to provide a signal — when particles of combustion are detected — which energizes the motor winding, causing displacement of the armature to strike the gong and sound the audible alarm.

THE DRAWINGS

In the several figures of the drawings like reference numerals identify like components, and in those drawings.

MECHANICAL ARRANGEMENT OF THE INVENTION

Figure 1:
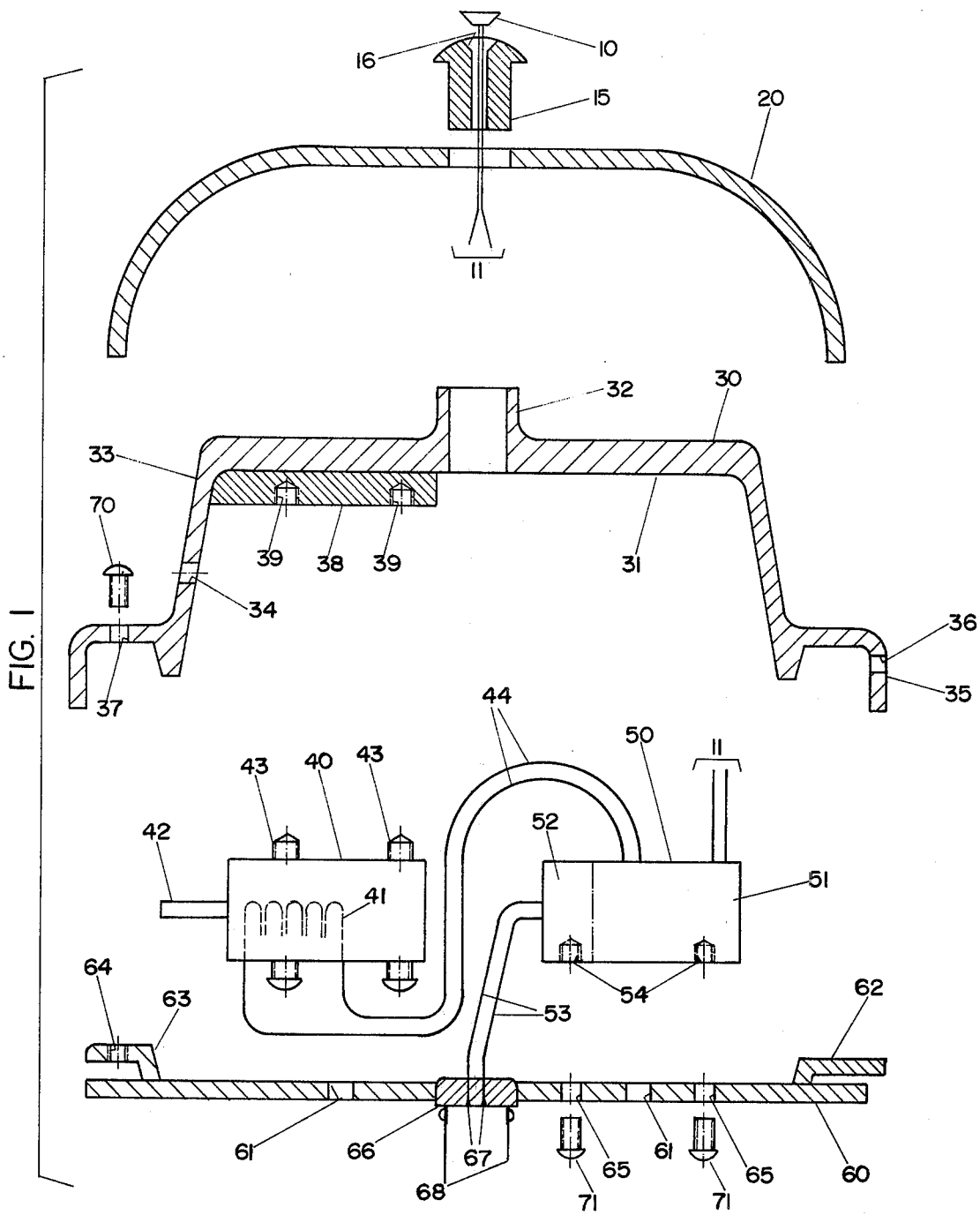
FIG. 1 is an exploded side view, partly in section, of a unitary detector-alarm system constructed and assembled in accordance with the inventive teaching.

FIG. 1 shows the major components of the alarm-detector assembly. From top to bottom, these components include a visible indicator 10, such as a light-emitting diode (LED); a fastening unit, shown as a bolt 15; a gong 20; a housing 30; an electrical motor unit 40; a combustion detector 50; and a back plate 60. Housing 30 is generally shaped like a flattened or truncated dome. The flattened upper portion 31 includes a central nipple 32 bored and tapped to receive the threads of bolt 15 in mating engagement. After bolt 15 is seated to secure gong 20 to housing 30, conductors 11 are passed through channel 16 in the center of bolt 15 and affixed in place by a suitable adhesive. The circular side wall portion 33 defines an aperture in one segment. A lower annular portion 35 extends outwardly from the main body of housing 30. As shown aperture 36 is defined in one portion of the lower annular part 35, and another aperture 37 is defined in a different part of the annular portion 35. A boss 38 is formed in one interior part of housing 30, and drilled and tapped to provide a pair of threaded cylindrical bores 39.

Electrical motor unit 40 is similar to a relay, in that it includes a winding 41 which can be energized to reciprocate an armature or plunger 42. Armature 42 is dimensioned to extend through aperture 34 in the side wall portion 33 of housing 30 so that, upon energization of winding 41, the armature can strike the edge of gong 20 to sound an audible alarm. Two screws 43 extend through correspondingly tapped bores (not shown) within motor housing 40 for receipt within the cylindrical tapped bores 39 of the boss 38 in the housing.

Combustion detector 50 includes an electrical circuit portion 51 and a power supply portion 52. A pair of conductors 53 provide for the energization of the components within power supply 52, in turn providing a suitable d-c voltage to energize the components within the circuit 51 in a well known manner. Combustion detector 50 also defines a pair of tapped bore portions 54 as shown.

Back plate 60 is generally flat, and defines apertures 61 for receiving any suitable fastener (not shown) for affixing the back plate to a suitable support such as the ceiling of the space to be monitored. The back plate includes a first lug portion 62, dimensioned to allow aperture 36 of the housing 30 to pass over the lug portion after the back plate is affixed to the suitable support. The back plate also includes a second lug portion 63, defining a tapped bore portion 64 therein of the appropriate dimensions to receive the threads of a screw 70 in mating engagement. After housing 30 has been positioned so that aperture 36 is encircling lug 62, bore 37 within housing 30 will be just above the tapped portion 64 of the back plate lug 63. The threaded portion of screw 70 is passed through the cylindrical bore 37 so that its threads are screwed into the tapped portion 64 of lug 63. Before the back plate is affixed in place, screws 71 are passed through the aperture 65 defined in the back plate 60 to be received within the threaded portions 54 of the smoke detector housing. In this assembly smoke detector housing 50 is thus fastened to and supported from the back plate. Housing 50 could be attached to a side wall of housing 30, or another boss could be formed in the housing 30.

An insulator block 66 is centrally affixed in back plate 60. A pair of female receptacles 67 are provided and electrical connections from these receptacles extend through insulator 66 for connection to conductors 53, providing a path for energy between the receptacles 67 and power supply 52. A pair of terminal-and-screw connectors 68 are also provided, one affixed to each of the receptacles 67. This allows for the electrical connection of individual conductors in place of the male prongs or a plug.

Figure 2:
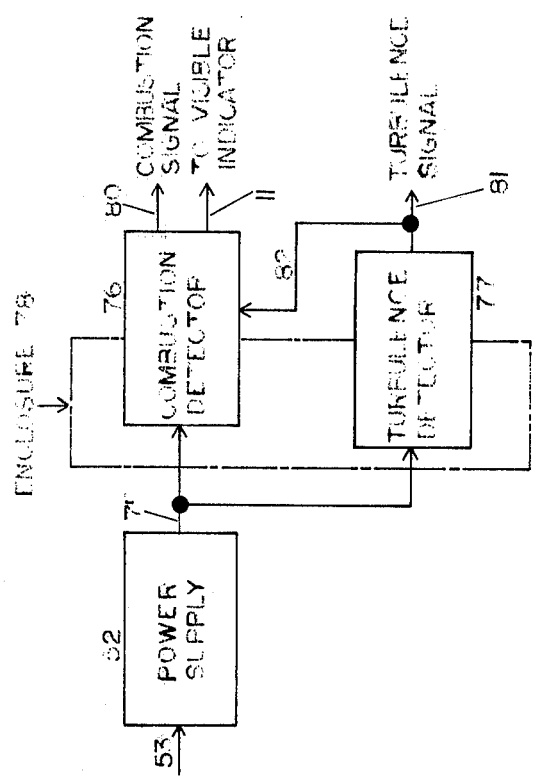
FIG. 2 is a block diagram of the electrical circuits of the invention.

FIG. 2 shows in block form the basic arrangement of the power supply and combustion detector system. Power supply 52 can be any suitable circuit, of which many are commercially available, for providing a d-c output voltage on line 75 upon receipt of an a-c energizing voltage on input line 53. In turn this d-c voltage is passed to the circuits within combustion detector 76 and turbulence detector 77. An enclosure 78 is represented schematically to indicate that there are reference components both in combustion detector 76 and in turbulence detector 77 which are shielded from ambient air movement to provide a reference signal. Upon detection of products of combustion, detector circuit 76 provides a first output signal on line 80, and a second output signal on line 11, for energizing a visible indicator such as LED 10. In accordance with another important aspect of this invention, turbulence detector 77 operates when air movement above a threshold level is exceeded not only to provide an output signal on line 81, but also to pass an override signal over conductor 82 to combustion detector 76, effectively preventing the issuance of a false signal on conductor 80 which could otherwise be caused by the air movement through the detection chamber.

With this initial perspective of the electronic system, a more complete description will now be given. However because various power supply circuits are well known and understood in this art, no further description of a power supply will be set out.

ELECTRICAL CIRCUITS

Figure 3:
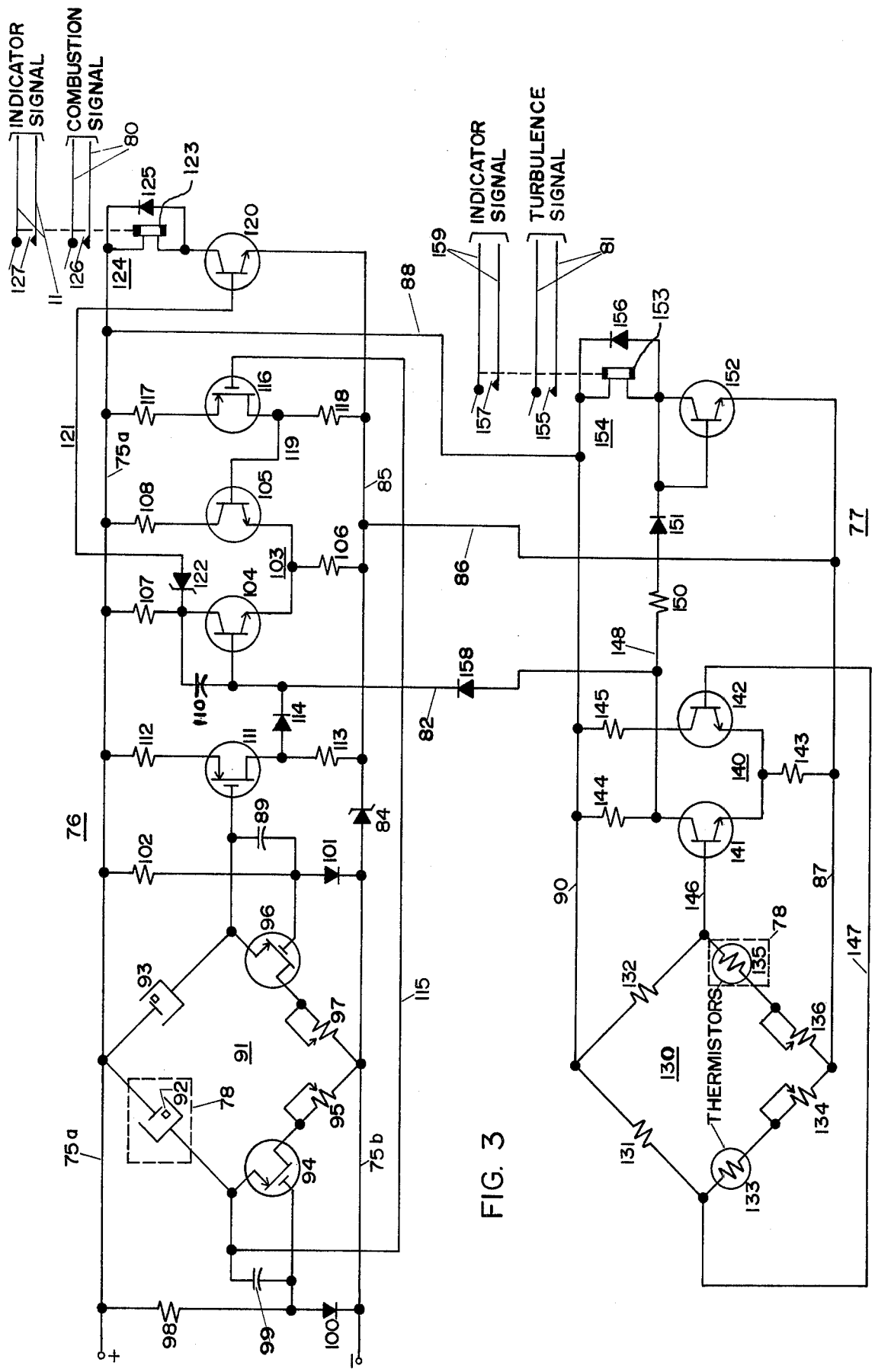
FIG. 3 is a schematic diagram depicting circuit details of the combustion detector circuit and turbulence detector circuit shown generally in FIG. 2.

The combustion detector circuit 76 is shown in the upper portion of FIG. 3, and the turbulence detector circuit 77 is set out in the lower portion. Turbulence detector 77 can be mounted adjacent combustion detector 76, or at a distance from the combustion detector. A d-c voltage is provided over conductors 75a and 75b from the power supply. For example this can be a potential difference of 24 volts d-c, with the potential on line 75a positive with respect to the potential on line 75b. A Zener diode 84 is coupled between conductor 75b and another conductor 85, which in turn is coupled over conductor 86 to conductor 87 in the turbulence detector circuit. The positive potential on line 75a is extended over conductor 88 to conductor 90 in the turbulence detector.

In the combustion detector circuit 76, another important component is the bridge circuit 91. Bridge circuit 91 has a pair of input terminals coupled to conductors 75a and 75b, and a pair of output terminals coupled to the gates of FET's 111 and 116. This circuit includes a first ionization type smoke detection chamber 92 in the first leg of the bridge circuit, shielded from air and particles of combustion by enclosure 78, and a similar detection chamber 93 in the second leg of the circuit. The third and fourth legs generally include impedance means. In the third leg, a field effect transistor (FET) 94 is coupled as shown in series with a first adjustable impedance 95. In this embodiment the adjustable impedance is shown as a variable resistor. Likewise another FET 96 and a second variable impedance 97 are connected as shown in the fourth leg of the bridge circuit. The FET's 94, 96 provide true infinite impedance sources for the respective ionization type detection chambers 92, 93. The variable resistances 95, 97 allow for effective matching of the impedances in the third and fourth legs of the bridge with the impedances of the ionization chambers. A first bias circuit including resistor 98 and diode 100 is coupled as shown between conductors 75a and 75b. The gate of FET 94 is coupled between the anode of diode 100 and resistor 98. A capacitor 99 is coupled between the gate and source of FET 94. The gate of the other FET 96 is connected between the anode of another diode 101 and resistor 102 in a corresponding bias circuit. Capacitor 89 is coupled between the gate and source of FET 96.

A difference amplifier 103 includes a pair of NPN type transistors 104, 105 having their emitters coupled together and connected over common resistor 106 to conductor 85. The collectors of these transistors are respectively coupled over resistors 107, 108 to conductor 75a. A capacitor 110 is coupled between the base and collector of transistor 104.

A first output connection of bridge 91 is coupled to the gate of another FET 111. The source of FET 111 is coupled over resistor 112 to conductor 75a, and the drain of this FET is coupled over another resistor 113 to conductor 85. The drain is also coupled over diode 114 to the base of transistor 104 in the difference amplifier circuit. The other output connection of bridge 91 is coupled over conductor 115 to the gate of another FET 116, which has its source coupled over resistor 117 to conductor 75a and its drain coupled over resistor 118 to conductor 85. The drain of FET 116 is also coupled over conductor 119 to the base of transistor 105 in the difference amplifier circuit. It is noted that detection chambers 92, 93 are in parallel, and the output signals from bridge 91 are coupled over parallel paths (FET's 111, 116) to the input connections of difference amplifier 103. All the FET's can be of the N-channel type.

The output circuit of the combustion detector includes another NPN type transistor 120, having its base coupled over conductor 121 and Zener diode 122 to the collector of transistor 104. The emitter of transistor 120 is coupled to conductor 85, and its collector is coupled through winding 123 of relay 124 to conductor 75a. A protective diode 125 is parallel coupled with the relay winding. The relay also includes a first contact set 126 for providing a combustion-indicating signal on conductors 80, and a second contact set 127 for providing an indicator signal on conductors 11, when the relay is actuated. Those skilled in the art will appreciate that other components can be connected in place of transistor 120 and relay 124 to provide one or more output signals responsive to an unbalance of the difference amplifier circuit 103.

In the lower part of FIG. 3 is the turbulence detector circuit 77. An important component of this detector circuit is another bridge circuit 130, which includes a pair of resistors 131 and 132 connected in the first and second legs of the bridge. In the third leg a thermistor 133 is coupled in series with the variable impedance 134, and in the fourth leg another thermistor 135 is similarly connected in series with another variable impedance 136. Thermistor 135 is enclosed within housing 78 to prevent any air movement from impinging on this thermistor. Accordingly thermistor 133 is the active element or detector in the bridge circuit 130. The thermistor is a well-known unit which has a negative temperature coefficient of resistivity. That is, when air passes over detector thermistor 133, the cooling effect of the air will increase the resistance of this component, causing a positive-going voltage change at the output connection between resistor 131 and thermistor 133, which voltage change appears on conductor 147.

Another difference amplifier circuit 140 is provided. This circuit also includes a pair of NPN type transistors 141, 142. The emitters of the transistors are coupled together and connected over a common resistor 143 to conductor 87. The collectors of the two transistors are individually coupled over resistors 144, 145 to conductor 90. The base of transistor 141 is coupled over conductor 146 to the described connection between resistor 132 and thermistor 135. The base of the other transistor 142 is coupled over conductor 147 to the common connection between resistor 131 and reference thermistor 133 in the bridge circuit 130.

The collector of transistor 141 is coupled over conductor 148, resistor 150 and diode 151 to the base of another NPN type transistor 152, the emitter of which is coupled to conductor 87. The collector of this transistor is coupled through the winding 153 of a relay 154, which also includes a contact set 155. The other side of relay winding 153 is coupled to conductor 90. A protective diode 156 is coupled in parallel with relay winding 153. Closure of contact set 155 provides a signal between conductors 81 indicating that turbulence has been sensed by the bridge circuit 130. At the same time contact set 157 provides a signal on conductors 159 for a visible indicator, such as an LED or other type of radiation emitter.

There is also another output connection from the collector of transistor 141, extending over diode 158 and conductor 82 to the base of transistor 104 in difference amplifier 103 of the smoke detector circuit. This is the path for the override signal described generally in connection with FIG. 2.

CIRCUIT OPERATION

In operation, upon the presence of products of combustion in detection chamber 93, the impedance of this detection chamber increases and decreases the drive to the gate of FET 111. This in turn decreases the signal passed over diode 114 to the base of transistor 104, lowering the conduction of this transistor. This difference amplifier reacts so that with the decreased conduction of transistor 104 and the consequent positive-going voltage at its collector, Zener diode 122 breaks over and a positive-going signal is passed over line 121 to gate on transistor 120, energizing relay 124 to close contact sets 126 and 127, providing the combustion-indicating and indicator-energizing signals.

This circuit has the advantage that the parallel-connection of reference chamber 92 with detection chamber 93 in bridge circuit 91 compensates the combustion detector circuit for long-term drift and component aging. This obviates the necessity for removal of the detection unit and recalibration at periodic intervals.

When air movement over the detector thermistor 133 exceeds a preset level — which level is preset by selecting the values of the components in the bridge circuit 130 — the effective resistance of thermistor 133 increases and a positive-going signal is passed over conductor 147 to the base of transistor 142. As transistor 142 conducts more heavily, the conduction of transistor 141 is correspondingly decreased. This decreased condution provides a positive-going signal at the collector of transistor 141, which signal is passed over conductor 148, resistor 150 and diode 151 to turn on transistor 152, energize relay 153 and provide a turbulence-indicating signal on conductor 81.

In accordance with another important aspect of this invention, the positive-going signal at the collector of transistor 141 is also passed over diode 158 and conductor 82 to the base of transistor 104. This acts as an override signal, in that transistor 104 is driven on more heavily to swamp out the effect of any decreasing signal passed from FET 111 over diode 114 when the moving air acted on the detection chamber 93 to simulate a smoke condition. At the same time the turbulence signal on conductors 81 is an indication that turbulence has occurred, and the maintenance crew can check the specific location for the cause of the turbulence.

Figure 4:
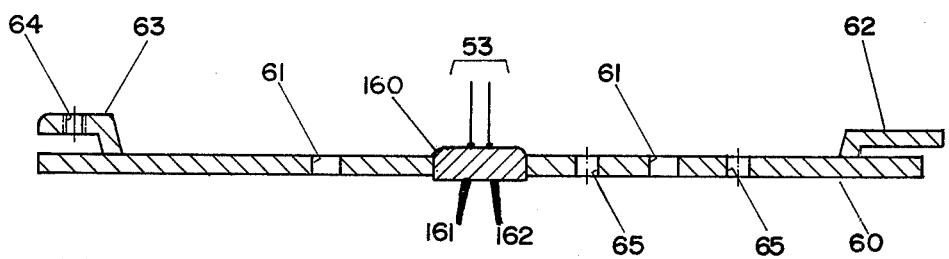
FIGS. 4 and 6 are partial schematic diagrams depicting additional embodiments of the turbulence detector.

FIG. 4 depicts another embodiment of the invention, and specifically a modified back plate 60. The back plate 60 in FIG. 4 differs from that originally shown in FIG. 1 in that a plug including an insulated portion 160 and a pair of electrically conductive prongs 161, 162 is affixed in the back plate 60. The prongs 161, 162 are electrically connected to conductors 53 which distribute the a-c energy to the power supply 52. When the assembly is made with the back plate of FIG. 4, the entire detector-alarm unit can be simply plugged into an existing female receptacle, rather than requiring special mounting of the back plate and electrical connections.

Figure 5:
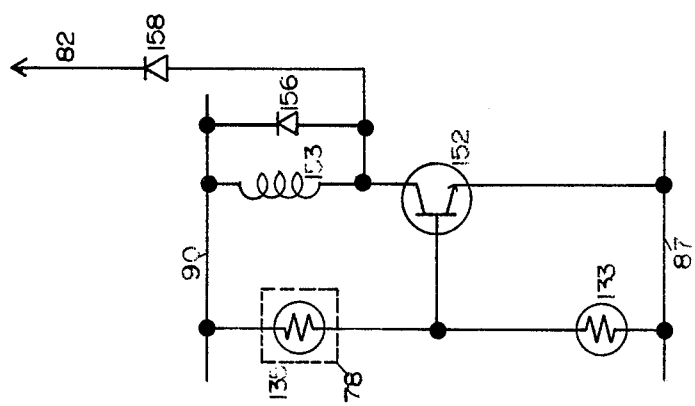
FIG. 5 is another side view of one component shown in FIG. 1, modified in accordance with another embodiment of the invention.

FIG. 5 shows an alternate embodiment for a turbulence detector. As there shown the two thermistors 133, 135 are connected in series between the energizing conductors 90, 87. The base of output transistor 152 is coupled to the common connection between the thermistors. Accordingly when air moves over sensing thermistor 133 its impedance is increased, providing a positive-going signal at the base of transistor 152 which drives this transistor on, passing current through the winding 153 to energize relay 154. At the same time the override signal is passed from the collector of transistor 152 over diode 158 and conductor 82 to the difference amplifier 103 in combustion detector 76. This simplified arrangement of the turbulence detector saves considerable space in the compact detector arrangement.

Figure 6:
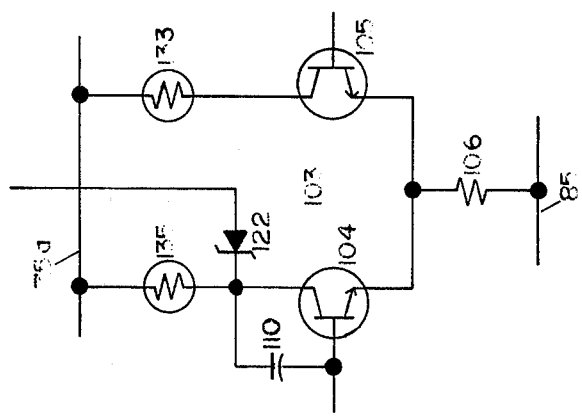

FIG. 6 shows another embodiment of the turbulence detector. In this arrangement, the resistors 107, 108 of difference amplifier 103 (FIG. 3) are replaced by the thermistors 135, 133. Thus if air movement over sensing thermistor 133 produces an increase in its effective resistance, transistor 105 conducts less and the conduction of transistor 104 increases. This in turn decreases the voltage at the cathode of Zener diode 122, preventing the issuance of a signal to turn on transistor 120 and indicate combustion, even if an unbalance in the bridge circuit 91 momentarily signals particles of combustion are present. In addition the circuit of FIG. 6 incorporates the long term compensation for atmospheric and temperature conditions directly between the detector bridge 91 and the output circuit 120, 124.

The capacitors, such as 89 and 99 in FIG. 3, connected between the gate and source of an enhancement mode metal oxide silicon field effect transistor (MOSFET) effectively turn the devices 94, 96 into short term current generators. That is, short term changes in source to drain current will be prevented within the limitation of the device dynamic range and the operating voltages applied. This occurs because the gate to source voltage at "pinch-off" condition is a function of source to drain current or vice versa, source to drain current may be adjusted by controlling gate to source current. This effect occurs over many decades of source to drain current.

In addition by utilizing the very high impedance of the MOSFET insulated gate, a small capacitor (such as 0.1uf) can be used to achieve a constant current effect over several hours. This time is sufficient to allow compensation for ambient changes, while still detecting the presence of particles of combustion which may appear within that time.

In the appended claims the term "connected" means a direct d-c connection between two components with virtually zero d-c resistance between those components. The term "coupled" indicates there is a functional relationship between two components, with the possible interposition of other elements between the two components described as "coupled" or "intercoupled."

While only particular embodiments of the invention have been described and claimed, it is apparent that various modifications and alterations may be made therein. It is therefore the intention in the appended claims to cover all such modifications and alterations as may fall within the true spirit and scope of the invention.

What is claimed is:

1. A detector circuit, comprising a bridge circuit including four legs and having a pair of input terminals and a pair of output terminals, a first ionization type detection chamber connected to one of the input terminals and in the first leg of the bridge circuit, a second ionization type detection chamber connected as a reference to said one input terminal and in the second leg of the bridge circuit, first and second FET's respectively connected in the third and fourth legs of the bridge circuit and coupled to the other of the input terminals, first and second bias circuits respectively connected to the first and second FET's in a manner to present a virtually infinite impedance source to the respective detection chambers in the first and second legs of the bridge circuit, means for energizing the bridge circuit, and means, coupled to the output terminals of the bridge circuit, for passing a combustion-indicating signal to associated equipment responsive to an unbalance of the bridge circuit indicating that particles of combustion are present adjacent one of the detection chambers.

2. A detector circuit as claimed in claim 1, and further comprising a difference amplifier circuit, coupled to said bridge circuit to provide an output signal responsive to an unbalance of the bridge circuit in the presence of products of combustion, and an output unit, connected to provide a combustion-indicating signal responsive to receipt of a signal from the difference amplifier circuit.

3. A detector circuit as claimed in claim 1, and further comprising an air turbulence detector circuit, connected to provide an output signal responsive to the detection of excessive air movement, and circuit means for passing said output signal from the air turbulence detector circuit to the combustion detector circuit to override the combustion detector circuit and prevent issuance of a combustion-indicating signal when the turbulence detector has sensed excessive air movement.

4. A detector circuit as claimed in claim 1, and further comprising first and second adjustable impedances, one connected in series with each of the FET's in the third and fourth legs of the bridge circuit, such that the impedances of the respective detection chambers can be effectively matched by the constant current sources provided by the FET's in the third and fourth legs of the bridge circuit.

5. A detector circuit as claimed in claim 1, and further comprising:
a housing including a side wall portion defining an aperture therein;
an electrical motor unit including a winding and an armature, affixed to the interior of said housing such that the armature extends through said housing aperture;
a gong affixed adjacent the housing side wall portion; and in which
said detector circuit is supported within said housing, and is operable to provide a signal to energize said motor winding, causing the armature to strike the gong and sound the audible alarm when products of combustion are detected.

6. An alarm-detector as claimed in claim 5, and further comprising a fastening unit extending through the gong and received in the upper part of the housing, retaining the gong adjacent the motor armature so that displacement of the armature will strike the gong and sound an audible alarm, and a back plate, including at least one aperture for mounting to any suitable support, and also defining a pair of lug portions for mating engagement with portions of the housing, to afford support for the entire housing and gong assembly when the back plate is secured in place and the other components secured to the back plate.

7. A detector circuit, comprising an ionization type detection chamber, an FET having a gate, a source and a drain, which FET is connected in series with the detection chamber at a reference connection point to present a virtually infinite impedance to the detection chamber, a bias circuit comprising at least two electrically conductive components series-connected at a common connection point, means coupling the common connection point between the series-connected bias components to the FET gate, means for energizing the detection chamber-FET circuit and the bias circuit, and means coupled to the reference connection point between the detection chamber and the FET for passing a combustion-indicating signal to associated equipment responsive to an unbalance of the detection chamber-FET circuit indicating that particles of combustion are present adjacent the detection chamber.

8. A detector circuit as claimed in claim 7, and further comprising a capacitor coupled between the source and the gate of the FET, to prevent short-term changes in source to drain current over the FET dynamic range, providing a constant current effect operation of the FET.

9. A detector circuit as claimed in claim 7, and further comprising a variable resistor connected in series with the source-drain circuit of the FET, to afford impedance matching between the detection chamber and the constant current source represented by the FET.

10. A detector circuit as claimed in claim 7 and further comprising:
 a housing including a side wall portion defining an aperture therein;
 an electrical motor unit including a winding and an armature, affixed to the interior of said housing such that the armature extends through said housing aperture;
 a gong affixed adjacent the housing side wall portion; and in which
 said detector circuit is supported within said housing and is operable to provide a signal to energize said motor winding, causing the amrature to strike the gong and sound the audible alarm when products of combustion are detected.

11. An alarm-detector as claimed in claim 10, and further comprising a fastening unit extending through the gong and received in the upper part of the housing, retaining the gong adjacent the motor armature so that displacement of the armature will strike the gong and sound an audible alarm, and a back plate, including at least one aperture for mounting to any suitable support, and also defining a pair of lug portions for mating engagement with portions of the housing, to afford support for the entire housing and gong assembly when the back plate is secured in place and the other components secured to the back plate.

12. A detector circuit, comprising an ionization type detection chamber, an active element connected as a constant current generator, which active element is connected in series with the detection chamber at a reference connection point to present a virtually infinite impedance to the detection chamber, a bias circuit comprising at least two electrically conductive components series-connected at a common connection point, means coupling the common connection point between the series-connected bias components to the active element, means for energizing the detection chamber-active element circuit and the bias circuit, and means coupled to the reference connection point between the detection chamber and the active element for passing a combustion-indicating signal to associated equipment responsive to an unbalance of the detection chamber-active element circuit indicating that particles of combustion are present adjacent the detection chamber.

* * * * *